Sept. 20, 1960   N. C. CHRISTOFILOS   2,953,750
MAGNETIC CABLE

Filed Sept. 4, 1956   4 Sheets-Sheet 1

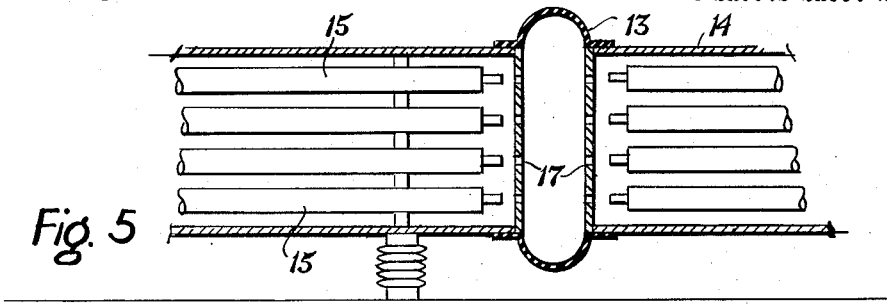
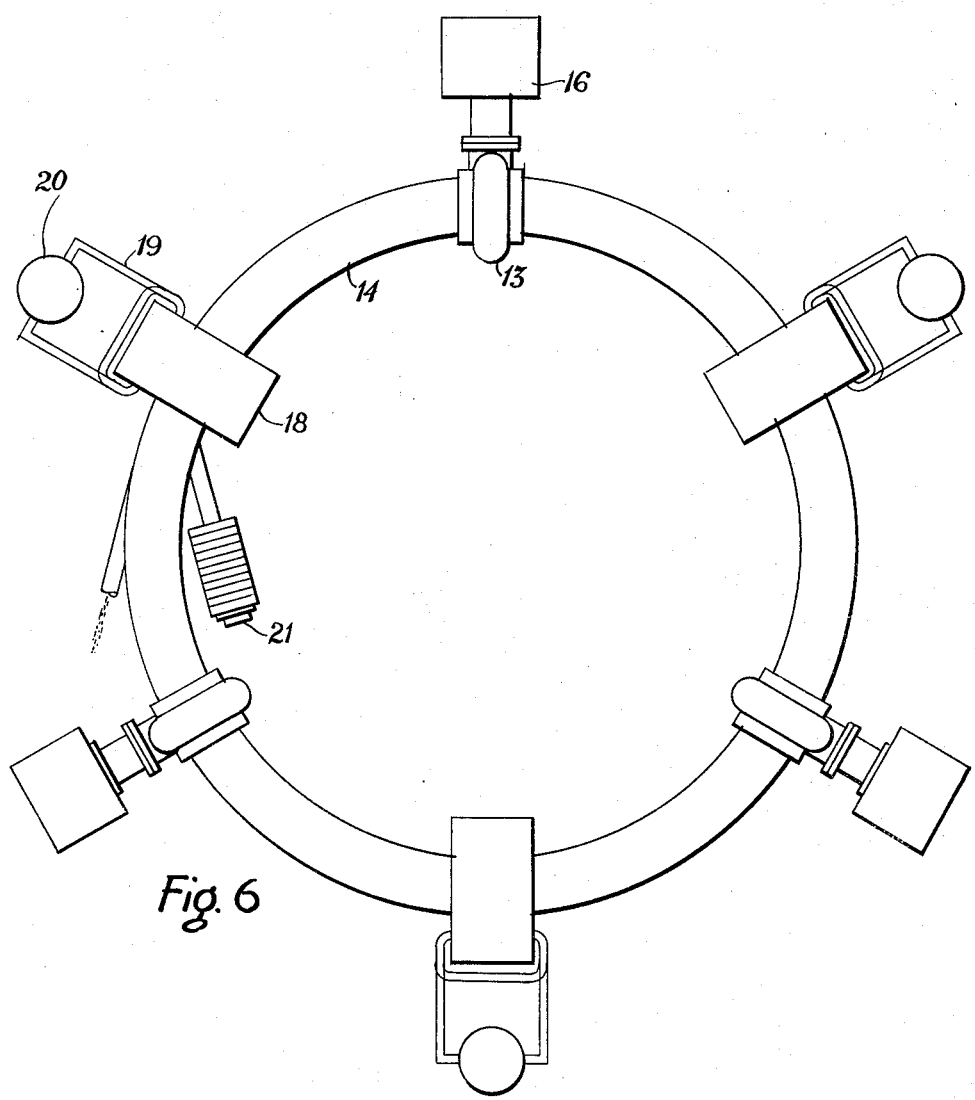

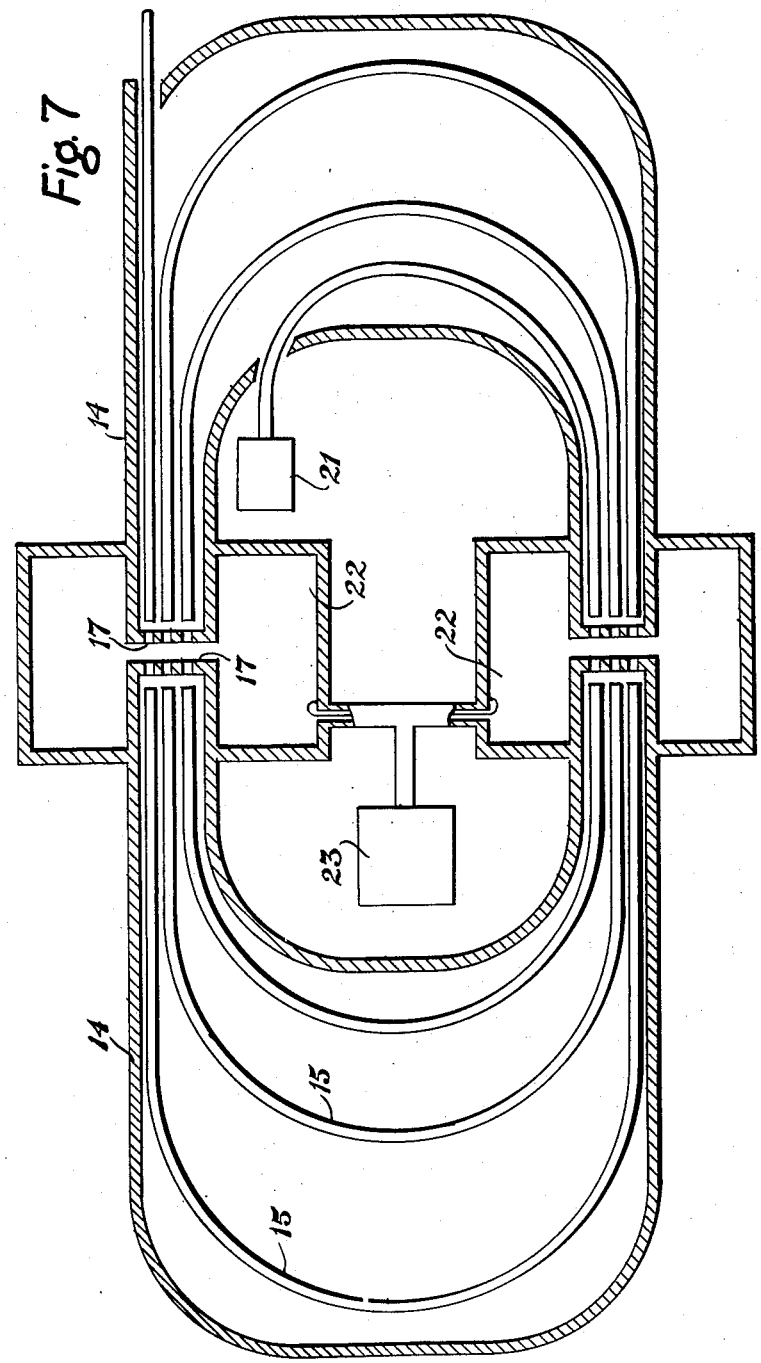

Sept. 20, 1960 N. C. CHRISTOFILOS 2,953,750
MAGNETIC CABLE

Filed Sept. 4, 1956 4 Sheets-Sheet 4

United States Patent Office 2,953,750
Patented Sept. 20, 1960

2,953,750
MAGNETIC CABLE

Nicholas C. Christofilos, Beach Drive,
Lake Ronkonkoma, N.Y.

Filed Sept. 4, 1956, Ser. No. 607,841

13 Claims. (Cl. 328—233)

This application is a continuation-in-part of my co-pending application, Serial Number 342,774, filed March 17, 1953, now abandoned, for a Magnetic Cable.

This invention relates to the guidance of fast charged particles, and in particular to a hollow cable which is permanently magnetized in such a way as to guide fast charged particles axially therethrough.

Such a magnetic cable has many useful applications. For example, the magnetic cable may be used in combination with a charged-particle accelerator in order to maintain the charged particles as a beam of small transverse dimensions during the acceleration. The magnetic cable may also be used to guide a high-intensity beam of fast charged particles for various purposes, such as injection into any kind of apparatus where fast particles are needed in considerable intensity for industrial applications, or guiding an electron beam against a target to produce X-rays or to cut or weld materials. The magnetic cable may also be used for the transmission of fast particles over long distances and in various other applications.

The invention together with further objects and advantages thereof may best be understood by reference to the following detailed description thereof, having reference to the accompanying drawings, in which:

Fig. 5 is a vertical section of a portion of a charged-particle accelerator embodying the invention and including a length of magnetic cable which has been formed into a coil and which has been severed so as to provide gaps across which charged particles are accelerated;

Fig. 6 is a plan view of the charged-particle accelerator a portion of which is shown in Fig. 5, wherein the charged particles are accelerated by magnetic induction;

Fig. 7 is a plan view of a charged-particle accelerator similar to that shown in Fig. 6, but wherein the charged particles are accelerated by radio frequency cavities;

Figure 1:
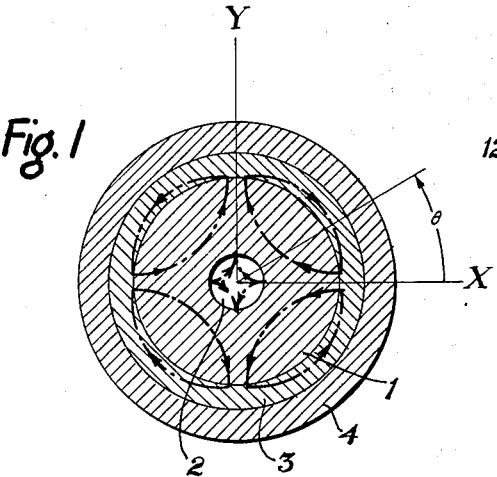
Fig. 1 is a view in cross-section of a magnetic cable embodying the invention.

Referring to the drawings, and first to Fig. 1 thereof, the magnetic cable of the invention comprises a tube 1 constructed of a permanent magnetic material such as Alnico, Cunico, and others. The interior 2 of the tube 1 is evacuated in any conventional manner so that fast charged particles traveling therethrough in an axial direction may undergo a minimum number of collisions with gas molecules or atoms. The tube 1 is preferably enclosed by a thin metal sheet 3 having high permeability, and the tube 1 and sheet 3 are in turn enclosed by a layer 4 of lead-alloy in order to assure vacuum tightness of the evacuated space 2.

The magnetic flux density within the evacuated space 2 must satisfy Maxwell's equations. Since the invention is concerned with the focusing field acting on the charged particles traveling therethrough, rather than the resultant field produced by both the tube 1 and the charged particles, the electric current within the tube 1 is taken as zero in Maxwell's equations, which then become:

$$\nabla \times B = 0 \qquad (1)$$

$$\nabla \cdot B = 0 \qquad (2)$$

Since any vector whose curl is zero may be expressed as the gradient of a scalar function, it follows from Equation 1 that the magnetic flux density B may be expressed as the gradient of a scalar potential $\Omega$, so that $$B = -\nabla \Omega \qquad (3)$$

substitution of Equation 3 in Equation 2 results in Laplace's equation:

$$\nabla^2 \Omega = 0 \qquad (4)$$

Solutions of Laplace's equation are derived in numerous textbooks. In axially symmetric fields where the field varies along the axis sinusoidally the general solution of Laplace's equation is:

$$\Omega = \alpha I_n(Kr) \cos(n\theta + Kz) \qquad (5)$$

where $$K = \frac{2\pi}{\lambda}$$

$I_n$ = the Bessel function of order $n$ with imaginary argument (i.e. $I_n(x) = J_n(ix)$)

$\alpha$ = a constant determined by the boundary conditions.

Substituting Equation 5 in Equation 4, the three field components are:

$$B_r = -K\alpha I_n'(Kr) \cos(n\theta + Kz) \qquad (6)$$

$$B_\theta = \frac{n\alpha}{r} I_n(Kr) \sin(n\theta + Kz) \qquad (7)$$

$$B_z = K\alpha I_n(Kr) \sin(n\theta + Kz) \qquad (8)$$

where $I_n'(Kr)$ is the first derivative of $I_n$ with respect to $(Kr)$. Expanding $I_n(Kr)$ in series:

$$I_n(Kr) = \frac{(Kr)^n}{2^n \cdot n!} \left[ 1 + \frac{(Kr)^2}{4(n+1)} + \cdots \right] \qquad (9)$$

As a practical matter, $\lambda$ will always be very much larger than the radius of the evacuated space 2, so that $$Kr = \frac{2\pi r}{\lambda} \ll 1 \qquad (10)$$

and therefore the higher-order terms of the series in Equation 9 may be neglected. Equations 6, 7 and 8 may now be rewritten as follows:

$$B_r = -K\alpha \frac{(Kr)^{n-1}}{2^n(n-1)!} \cos(n\theta + Kz) \qquad (11)$$

$$B_\theta = K\alpha \frac{(Kr)^{n-1}}{2^n(n-1)!} \sin(n\theta + Kz) \qquad (12)$$

$$B_z = K\alpha \frac{(Kr)^n}{2^n \cdot n!} \sin(n\theta + Kz) \qquad (13)$$

At $\theta = 0$, $z = 0$, $r = r_0$ let $B_r = -B_0$. Then, from Equation 11:

$$\frac{K\alpha K^{n-1}}{2^n(n-1)!} = \frac{B_0}{r_0^{n-1}} \qquad (14)$$

Substituting Equation 14 in Equations 11, 12 and 13:

$$B_r = -B_0 \left(\frac{r}{r_0}\right)^{n-1} \cos(n\theta + Kz) \qquad (15)$$

$$B_\theta = B_0 \left(\frac{r}{r_0}\right)^{n-1} \sin(n\theta + Kz) \qquad (16)$$

$$B_z = B_0 \left(\frac{Kr}{n}\right) \left(\frac{r}{r_0}\right)^{n-1} \sin(n\theta + Kz) \qquad (17)$$

Since the amplitude of $B_z$ is $$\frac{Kr}{n}$$

times the amplitude of the two other components, $B_r$ and $B_\theta$, it may be neglected in view of Equation 10. The simplest field pattern is obtained by setting $n=2$ in Equations 15 and 16; when this is done, there result the following equations:

$$B_r = -B_0 \frac{r}{r_0} \cos\left(2\theta + \frac{2\pi z}{\lambda}\right) \qquad (18)$$

$$B_\theta = B_0 \frac{r}{r_0} \sin\left(2\theta + \frac{2\pi z}{\lambda}\right) \qquad (19)$$

where $r_0$ = the radius of the cylindrical evacuated space 2 in centimeters
$B_0$ = the magnetic flux density at the radial distance $r_0$ from the axis of the evacuated space 2 in gauss
$B_\theta$ = the tangential component of the magnetic flux density at the point $(r, \theta)$ in gauss
$B_r$ = the radial component of the magnetic flux density at the point $(r, \theta)$ in gauss
$r$ = the radial distance of the point $(r, \theta)$ from the axis of the evacuated space 2 in centimeters
$\theta$ = the counterclockwise angular displacement of the point $r, \theta$) from the reference axis (shown as extending horizontally to the right in Fig. 1) in radians
$z$ = the distance, measured along the axis of the evacuated space 2, between the transverse plane in which the point $(r, \theta)$ lies and the reference plane $z=0$, in centimeters. In the following description said reference plane is taken as the plane of the drawing, and the Z-axis is taken as extending into the drawing and perpendicular thereto At any point along the length of the tube 1, the magnetic field in the evacuated space 2 defined by Equations 18 and 19 is similar in direction and density distribution to that produced in the armature space of a four-pole direct-current generator. It is therefore evident that the tube 1 may be magnetized by relatively simple apparatus, and one embodiment of such apparatus will be described in detail hereinafter.

Referring to Fig. 1, the B field is therein shown by broken lines having directional arrows. It will be apparent that the B-field lines within the evacuated space 2 comprise a family of pairs of equilateral and conjugate hyperbolas such that in each pair the direction of the B-field lines are mutually opposite. It may be observed that the magnitude of B is a function of $r$ only and not of $\theta$, whereas the direction of B is a function of $\theta$ only and not of $r$. It may also be noted that the components of B in rectangular coordinates take the simple form:

$$B_x = -\frac{B_0}{r_0} x \qquad (20)$$

$$B_y = \frac{B_0}{r_0} y \qquad (21)$$

where the X-axis extends horizontally to the right and the Y-axis extends vertically upwards as shown in Fig. 1.

Since the charged particles travel fast through the magnetic cable, it is possible to neglect the transverse components of the velocity of the charged particles and to assume that the velocity vector is always directed parallel to the axis of the magnetic cable. Then the lines of force lie in the plane of Fig. 1 and comprise a second family of pairs of equilateral and conjugate hyperbolas having an angular displacement of $$\frac{\pi}{4}$$

with respect to the first family. If the velocity vector is directed into the drawing, then said angular displacement will be counterclockwise for electrons and clockwise for positive ions.

The B-field pattern shown in Fig. 1 is maintained throughout the length of the magnetic cable, except that it is rotated about the axis of the tube 1 as indicated by Equations 18 and 19.

According to the principles of "strong focusing," a magnetic field in the evacuated space 2 of the type described by Equations 18 and 19 will accelerate the fast charged particles, which are traveling axially therethrough, towards the axis of the evacuated space 2 from all directions so as to focus said charged particles if the value of $\mu$ does not exceed 0.44, where $\mu$ is defined by the following equation:

$$\mu = \frac{150 H_c \lambda^2}{4\pi^2 r_0 \beta V} \qquad (22)$$

where $V$ = the total energy per unit charge of the charged particles in volts: that is, the sum of the kinetic energy per unit charge and the rest energy per unit charge of the charged particles in volts. Thus, for 2-Mev electrons $V$ would be 2,510,000 volts. The total energy of a particle of mass $m_t$ grams is $m_t c^2$ ergs. If the particle has a charge of $e$ coulombs, then the total energy may be expressed in volts by means of the relation:

$$m_t c^2 = eV \cdot 10^7 \qquad (23)$$

$H_c$ = the coercive force of the material of which tube 1 is composed in oersteds
$\beta$ = the velocity of the charged particles divided by the velocity of light in vacuo (dimensionless)
$\lambda$ = the wavelength which appears in Equation 18 and 19 in centimeters The principles of "strong focusing" are set forth in an unpublished manuscript by the present inventor entitled "Focusing System for Ions and Electrons and Application in Magnetic Resonance Particle Accelerators," prepared in early 1950, and in my co-pending application, filed March 10, 1950, Serial Number 148,920, now U.S. Patent No. 2,736,799. The principles of "strong focusing" may be briefly summarized as follows:

A strong-focusing field of force may be defined as a field of force which in any plane transverse to the predetermined orbit in which the beam of charged particles is to be focused includes both focusing and defocusing forces, and which varies in the dimension parallel to the orbit in such a way that each particle alternately experiences focusing and defocusing forces in cyclic fashion, the mean value of the former exceeding the mean value of the latter in each cycle. A focusing force may be defined as a force having a component directed towards the orbit; a defocusing force may be defined as a force having a component directed away from the orbit. If the field of force varies periodically in the dimension parallel to the orbit, then the integral of the force over any cycle along a line parallel to the orbit is equal to zero. However, the particles under the influence of the alternating field undergo forced oscillations normally to their orbit, such that each particle reaches a maximum distance from the orbit when it is in a focusing field and a minimum distance from the orbit when it is in a defocusing field. If the field strength increases as the distance from the orbit increases, then the mean value of the radial forces exerted on the particles over any cycle is not equal to zero, but is directed towards the orbit.

The magnetic field defined by Equations 18 and 19 produces a strong-focusing field of force with respect to fast charged particles having a velocity component substantially only in the Z direction; i.e., the transverse velocities of said charged particles are small. The invention is not limited thereto, but includes all other strong-focusing fields of force which can be produced by appropriate permanent magnetization of a magnetic cable. However, the magnetic field defined by Equations 18 and 19 has been selected to illustrate the invention because of its relative simplicity for purposes of analysis and manufacture.

Equation 22 may be derived from Equation 10 of said U.S. Patent No. 2,736,799. Said Equation 10 is as follows:

$$\mu = \frac{\epsilon \lambda^2}{4\pi^2 \beta^2 V} \quad (24)$$

where $\epsilon$=the force per unit charge at a unit distance from the orbit in volts/cm.$^2$ From the definition of $\epsilon$, it is clear that in the magnetic cable $$\epsilon = \frac{300 \beta B_0}{r_0} \quad (25)$$

Since $B_0$ can be increased by using magnetic materials of high coercive force, it is apparent that $B_0$ is a function of $H_c$; and I have determined from experiment that $$B_0 \approx \tfrac{1}{2} H_c \quad (26)$$

In experiments performed by me to date, Equation 26 has been accurate within ±20%.

The magnetic cable need not lie in a straight line, but the radius of curvature of the axis of the magnetic cable must be large enough so that the centrifugal force on the charged particles is compensated by the focusing force of the magnetic cable. The mean value of the focusing force is given by Equation 28 of the aforementioned U.S. Patent No. 2,736,799, and the minimum permissible radius of curvature is obtained by setting this mean value equal to the centrifugal force and assuming that the maximum permissible deviation from the orbit is $r = \tfrac{1}{2} r_0$.

$$e \frac{r_0}{2} \frac{\mu}{2} = \frac{mv^2}{R_{\min}} \quad (27)$$

where $R_{\min}$=the minimum permissible radius of curvature of the axis of the magnetic cable in centimeters Substitution of Equations 24, 25, and 26 in Equation 27 results in the following equation:

$$R_{\min} = r_0 \left[ \frac{\beta V}{12 H_c \lambda} \right]^2 \quad (28)$$

Since the value of $\mu$ must not exceed 0.44, the maximum permissible wavelength $\lambda_{\max}$ may be obtained by substituting 0.44 for $\mu$ and $\lambda_{\max}$ for $\lambda$ in Equation 22 and solving for $\lambda_{\max}$:

$$\lambda_{\max} = 2\pi r_0 \sqrt{\frac{0.44 \beta V}{150 H_c r_0}} \quad (29)$$

Figure 2:
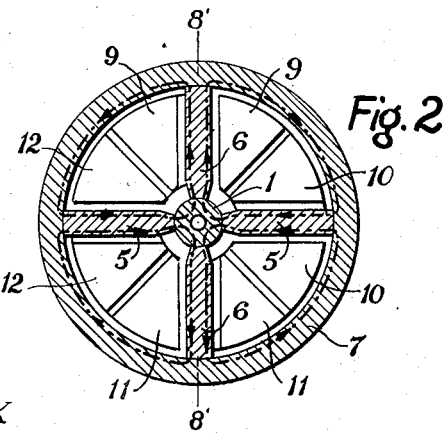
Fig. 2 is a view in cross-section of a device by means of which the magnetic cable of Fig. 1 may be magnetized.
Figure 3:
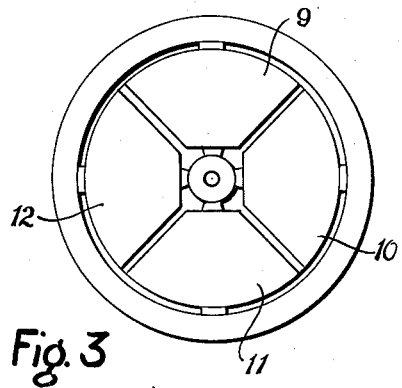
Fig. 3 is an end view of the device shown in Fig. 2.
Figure 4:
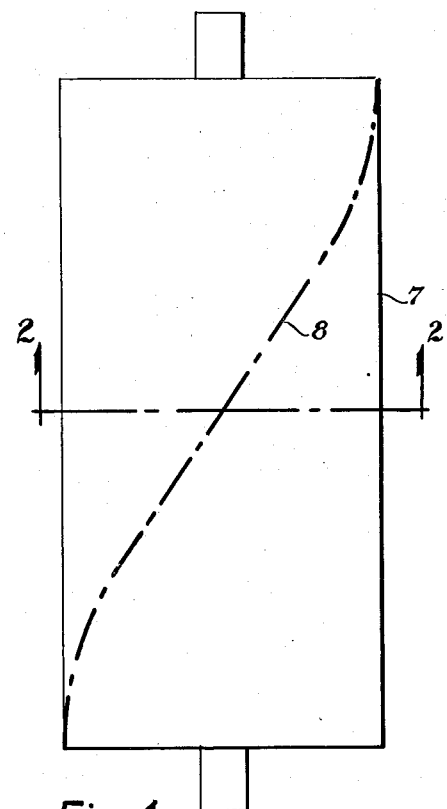
Fig. 4 is a somewhat diagrammatic plan view of the device shown in Fig. 2.

A device by means of which the tube 1 may be magnetized in accordance with the invention is shown in Figs. 2, 3 and 4. Fig. 2 is a cross-section along the line 2—2 of Fig. 4, and resembles the cross-section of a four-pole direct-current generator of which the armature has been replaced by the tube 1. In Fig. 2 as in Fig. 1 the B field is shown by the broken lines having directional arrows. Thus the ends of the two pole-piece 5 (shown as extending horizontally in Fig. 2) which abut against the tube 1 are north poles, while the ends of the two pole-pieces 6 (shown as extending vertically in Fig. 2) which abut against the tube 1 are south poles. The magnetic circuit is completed by a tubular yoke 7 surrounding the pole-pieces 5, 6.

In order to produce the hereinbefore-described rotation of the B-field pattern along the axis of the magnetic cable, the pole-pieces 5, 6, are constructed so that the ends thereof which abut agoinst the tube 1 describe helices, as shown by the broken line 8 in Fig. 4 which constitutes a trace, on the outer surface of the tubular yoke 7, of the axis 8'—8' (Fig. 2) passing through the south-pole-pieces 6. It is apparent from Equations 18 and 19 that the B-field pattern completes a cycle in a length $z = \lambda$; and it is apparent from Figs. 2 and 4 that the B-field pattern completes a cycle after the pole-pieces 5, 6 have been rotated through $\pi$ radians. Therefore, the pitch of the helix 8 (Fig. 4) should be equal to $2\lambda$, but the length of the magnetizing device need not exceed $\lambda$, and in Fig. 4 the length of the magnetizing device, comprising the pole-pieces 5, 6 and the yoke 7, is shown as equal to $\lambda$. The magnetizing device is magnetized by means of coils, shown in Fig. 2 as comprising four coils 9, 10, 11 and 12, each of which is wound about one of the four pole-pieces 5, 6. The manufacture of a permanent magnet of the type used in this invention requires a material having a high coercive force; and, in order to maximize the magnetic flux density B inside the evacuated space 2, the magnetizing field produced by the coils 9–12 should be as high as possible. Thus, for example, the coils 9–12 may be energized by discharging a condenser bank connected to said coils by means of a thyratron tube, in order to achieve the high current necessary to create a large magnetizing field. The necessary magnetization may be effected during a single current pulse, so that only a short period of time is necessary to magnetize a length of cable equal to the length of the magnetizing device. Considerable lengths of magnetic cable may thus be magnetized by treating in sequence a series of lengths equal to $\lambda$ or some integral multiple of $\lambda$, depending upon the length of the magnetizing device.

After magnetization the tube 1 may, if necessary, be suitably treated to retain the magnetism, and thereafter is covered with the sheets 3 and 4. However, such treatment to retain magnetization will generally not be necessary, since manufacturers of permanent magnetic materials deliver such materials already heat-treated.

Magnetizing techniques are well known in the art and need not be elaborated upon here in detail.

The outer diameter of the magnetic cable depends on radius $r_0$ of the evacuated space 2, said radius $r_0$ being selected so that the magnetic field produced at the tube 1 by the current of high-energy charged particles traveling in the evacuated space 2 cannot distort the focusing field by magnetization or demagnetization of the permanent magnet 1. If $H_i$=the magnetic field produced by the charged-particle current in oersteds
$i$=the charged-particle current in amperes then the foregoing requirement may be expressed as follows:

$$H_i = \frac{i}{5r_0} \ll H_c \tag{30}$$

Thus, for example, even for an electron beam current of 20 amperes and a diameter of $2r_0$ of the evacuated space 2 (i.e. the inner diameter of the magnetic cable) of only ⅜ inch, $H_i$ equals 8 oersteds and so is much less than $H_c$, which is equal to about 600 or 700 oersteds for the materials hereinbefore mentioned.

By combining the magnetic cable of the invention with appropriate means for accelerating charged particles, such as are well-known in the art, a charge-particle accelerator may be constructed which is capable of producing beams of considerable intensity. Such a charged-particle accelerator, constructed in accordance with the invention will accelerate charged particles in an orbit which is substantially circular but open, and comprises a magnetic cable which is severed so as to form a plurality of gaps spaced along the length thereof. The magnetic cable is permanently magnetized as hereinbefore described. Charged particles are injected into one end of the magnetic cable and are ejected from the other end thereof. As the particles travel from one end of the cable to the other, they are accelerated by conventional charged-particle-accelerating means each time they cross a gap, and so their energy is increased stepwise. Accordingly, the wavelength of the magnetic sections of the cable is increased after each gap, so that the strong-focusing action is maintained throughout the length of the cable despite the change in energy of the particles.

A suitable combination of the magnetic cable of the invention with conventional charged-particle-accelerating means is shown in Figs. 5 and 6. Referring thereto, a length of magnetic cable is coiled in substantially helical form within a toroidal sheath which includes alternate insulating sections 13 and conductive sections 14. The toroidal sheath 13, 14 thus constitutes a conductive loop which is severed so as to form at least one gap therein. The magnetic cable 15 is severed at each insulating section 13 so as to form a plurality of gaps in the magnetic cable 15. Actual physical insulating sections of cable are not required, owing to the fact that the entire toroidal sheath 13, 14 is evacuated by conventional vacuum pumps 16. By evacuating the apparatus in this manner, one avoids the low pumping speed that would result from attempting to evacuate a single integral length of cable. The width of the insulating sections 13 is relatively small, so that the gaps between consecutive segments of the magnetic cable 15 are small enough so that the beam of charged particles is not appreciably defocused in traveling across said gaps. Each conductive section 14 of the sheath terminates in conductive end-plates 17 which are perforated with the same number of holes as there are turns in the severed length of magnetic cable 15. Each conductive section 14 of the sheath thus acts as a Faraday cage, so that a substantially field-free space or drift space exists therewithin. Each magnetic section 15 within the conductive section 14 is electrically connected to the conductive section 14 in some appropriate manner, and each end of each segment of the magnetic cable 15 is positioned opposite one of the holes in the adjacent end-plate 17.

While it frequently may be convenient to provide the sheath 13, 14 with only one insulating section 13, it will in general be desirable to have a plurality of gaps in the magnetic cable 15.

Any appropriate means for accelerating charged particles across the gaps at the insulating sections 13 may be used, and two such means are illustrated in the drawings. In Fig. 6, the charged particles are accelerated by means of the betatron principle. Each conductive section 14 is at least partly encircled by a ring 18 of suitable ferromagnetic material which is energized by a primary coil 19 which is connected to a suitable source 20 of A.C. voltage. The sources 20 are all operated in phase with one another. Thus the toroidal sheath 13, 14 constitutes a single loop through which the total magnetic flux generated by all the primary coils 19 passes, and in this respect the sheath 13, 14 is similar to the secondary coil of a conventional transformer.

Charged particles are injected at one end of the magnetic cable 15 by means of a suitable injector 21 at about a few tens of kilovolts or more, depending on the current desired. The injection voltage should be high enough, at the current desired, so that space charge limitations constitute no problem. Each turn of the severed length of magnetic cable 15 constitutes a loop encircling the total flux produced by the primary coils 19, and the total E.M.F. per turn, assuming a sinusoidal variation of the flux in the primary coils 19, is $$-\omega\phi \cdot 10^{-8} \cos \omega t \text{ volts}$$

where $\omega$ = the angular frequency of the A.C. in the primary coils 19 in radians per second
$\phi$ = the maximum value of the total flux embraced by the loop in maxwells Since there is practically no voltage drop along each conductive section 14 of the toroidal sheath, substantially the entire E.M.F. appears across the gaps at the insulating sections 13. The charged particles then emerge from the severed length of magnetic cable 15 with maximum energy:

$$N\omega\phi \cdot 10^{-8} \text{ electron volts}$$

where N = the number of turns of the severed length of magnetic cable 15.

Such an accelerator has definite advantages over the conventional betatron, which requires a guiding field. In the accelerator of the invention, the magnetic cable provides the guiding field. This eliminates the necessity for the additional magnetic field and also the necessity for proper adjustment of the magnetic flux and rate of change thereof during the acceleration process. Moreover, the magnetic cable provides a focusing action which is very much stronger than that provided by the conventional betatron.

An alternative means for accelerating charged particles through a magnetic cable is shown in Fig. 7. Referring thereto, a reentrant-type resonant cavity 22 is provided between consecutive conductive sections 14, with the adjacent conductive sections 14 and end-plates 17 providing a major portion of the boundary of the cavity 22. The cavities 22 are appropriately excited to accelerate charged particles across the gaps between the conductive sections 14, and if there are many cavities they should be driven in proper phase relationship with one another, as by connecting them all to the same RF power source 23. In order that the charged particles may arrive at each cavity 22 in proper phase relationship with the radio-frequency field, the frequency of revolution of the charged particles in the toroidal sheath 14 should be constant. Consequently the length of the segments of the magnetic cable 15 increases from the injector 21 to the other end of the helical, severed length of magnetic cable 15, in order to compensate for the increase in velocity of the charged particles. Of course, as this velocity approaches the velocity of light in vacuo, the increase in velocity per turn becomes very small.

For example, if there are two cavities, as shown in Fig. 7, which are driven in phase with each other, then the length of the path traveled by the charged particles from the center of the gap in one cavity to the center of the gap in the other cavity should be $N\beta L$, neglecting velocity changes in the gaps, where L is the free space wavelength of the high-frequency oscillations in the cavities. If there is a phase shift of 180° between the two cavities, then the length of the path between the centers of the gaps should be ½NβL.

Unlike the magnetic induction accelerator of Fig. 6, it is not necessary to have actual physical insulating sections 13, since the resonant cavities 22 create an electric field between the conductive sections 14 without the necessity therefor. The vacuum pumps (not shown) which are used to evacuate the resonant cavities 22 may also serve to evacuate the toroidal sheath 14, since the conductive sections 14 and the resonant cavities 22 together form a single vacuum-tight enclosure.

After charged particles have been accelerated by such an accelerator, they may be transmitted through a magnetic cable over relatively long distances; and, on arrival at a remote location, the charged particles may be caused to travel through a device similar to such an accelerator in reverse so as to produce electric power. Thus, one aspect of the invention is its use for the transmission of power over relatively long distances: i.e., the magnetic cable can be used as a power transmission line. For power-transmission purposes one would use standard frequencies, such as 25 cycles per second for railroads or 60 cycles per second for other uses. At these low frequencies the apparatus of Fig. 7 would not be feasible, consequently, magnetic-induction acceleration, as shown in Fig. 6, would be used. As a general rule, induction acceleration would always be used for relatively high power units, with the resonant cavity technique being limited to high frequencies and relatively low power units.

Figure 8:
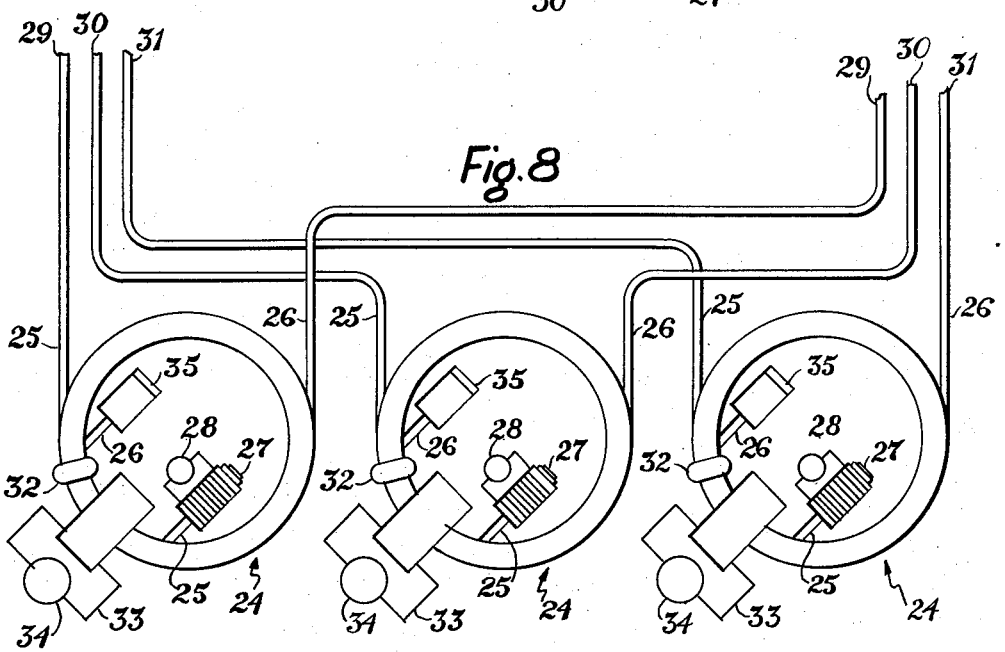
Fig. 8 is a diagrammatic view of the power-transmitting section of a 3-phase transmission network embodying the invention.
Figure 9:
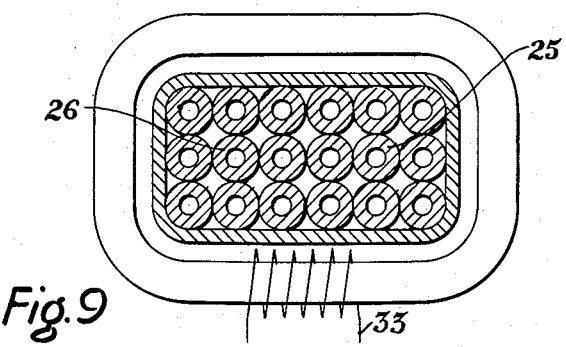
Fig. 9 is a vertical section of a portion of one of the power-transmitting transformer units of Fig. 8.

Referring now to Figs. 8 and 9, a suitable power-transmitting station would comprise, for example, three transformer units 24, so as to give a 3-phase network. Each transformer unit 24 would be similar to the induction-type accelerator hereinbefore described, except that each transformer unit 24 has two severed lengths 25, 26 of magnetic cable constituting "secondaries," rather than the single length 15 shown in Figs. 5, 6 and 7. One "secondary" 25 has an electron gun 27 at one end thereof; and the electron gun 27 is pulsed by a conventional pulsing circuit 28 once per cycle so that the electrons ejected from the electron gun 27 are accelerated by the betatron effect up to tens of mev. The other end of the same "secondary" 25 is connected to one 29 of three transmission lines 29, 30, 31, each of which comprises a magnetic cable as hereinbefore described; and the other end of that transmission line 29 will be in general connected to one of the "secondaries" of another of the 3 transformer units 24. The returning end of each transmission line 29, 30, 31 is connected to that transformer unit which is in proper phase so that as the returning high-energy electrons, which constitute a pulsed beam, cross each insulating section 32, they induce a varying flux which links the primary coils 33 and which is in proper phase so as to return power to the A.C. generator 34 feeding the primary coils 33. In this manner the electrons are decelerated to at most their injection energy, which is a few tens of kilovolts. This energy must be dissipated, and so the decelerated electrons are directed against an adequately cooled collection cup 35.

The total length of each transmission line 29, 30, 31 should be a multiple of $$\frac{L}{6}$$

where L is the free space wavelength of the operating frequency, so that the electrons return to each transformer unit 24 out of phase with the electrons leaving that transformer unit by a multiple of 180°. The electrons being decelerated are caused to travel in the same or opposite sense as the electrons being accelerated, depending upon whether the phase difference is an odd or even multiple of 180° respectively.

Figure 12:
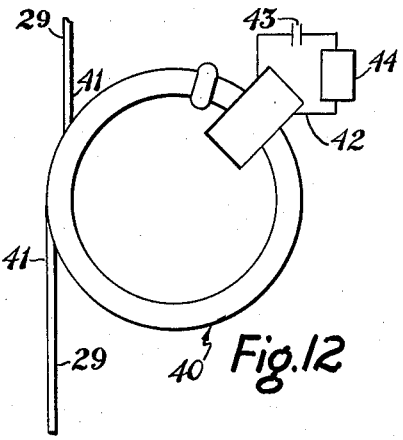
Fig. 12 is a diagrammatic view of another form of transformer unit suitable for use in one of the sub-stations of the transmission network of Fig. 10.
Figure 10:
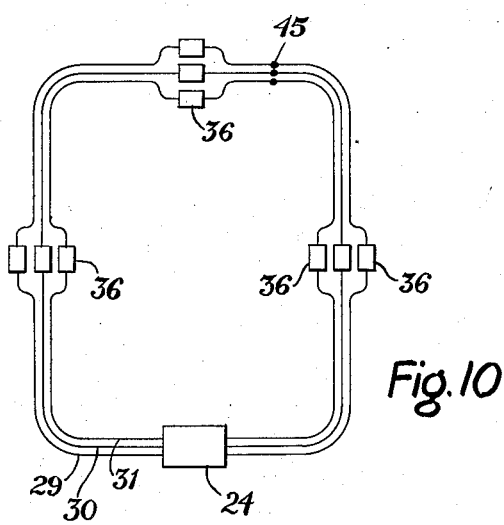
Fig. 10 is a schematic representation of the electric circuit of a 3-phase transmission network embodying the invention.
Figure 11:
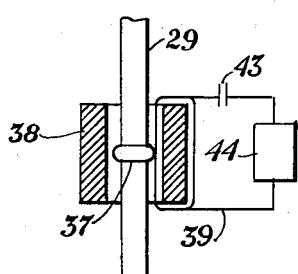
Fig. 11 is a diagrammatic view of one form of transformer unit suitable for use in one of the sub-stations of the transmission network of Fig. 10.

Referring now to Figs. 10, 11 and 12, power is extracted from each of the transmission lines 29, 30, 31 at the remote stations 36, and the circuit operates as a constant-current variable-voltage network. If only a small amount of power is to be consumed, the sub-station 36 may comprise merely a single insulating section 37, as shown in Fig. 11, with a magnetic ring 38 around the transmission line 29 in the vicinity of the insulating section 37, the ring 38 in turn being encircled by a coil 39. If the coil 39 is open, there is no change in the electrons' energy. If there is power consumption, the back E.M.F. produced by the current in the coil 39 slows down the electrons and thus absorbs power from the electron beam.

If a large amount of power is to be consumed, the substation 36 may comprise a multi-turn transformer 40 as shown in Fig. 12 which is similar to the induction-type accelerator hereinbefore described, except that the injector 21 is omitted, the incoming electrons are directed from the transmission line 29 directly into the severed length of cable 41, and the wavelength λ of the magnetic cable 41 does not vary along the length thereof, but is selected so as to provide focusing action for the required energy range. Thus, for example, the network might be designed so that each transmitting transformer unit 24 ejects electrons at 100 mev., and the power consumption might be limited so that the electrons return to the transmitting transformer units 24 with energies of at least 50 mev. Then the transmission lines 29, 30, 31 and remote station 36 would be designed with a wavelength λ and a radius of curvature R such that electrons having an energy between 50 and 100 mev. will be focused, in accordance with Equations 28 and 29.

The electrons are sent through the transmission lines 29, 30, 31 as a beam which is pulsed both in energy and in current, since both the generator 34 for the primary coils 33 and the circuit 28 for the electron gun 27 provide a pulsed output. The primary coils 39, 42 of the substation transformers 36 are equipped with capacitances 43 so as to constitute a resonant circuit, and thus deliver power to the load 44 in sinusoidal form. The capacitance 43 may comprise a condenser or a synchronous motor which has been properly excited to appear as a capacitive load. This circuit resembles Class C operation of electron tubes, in which an impulse of current through the tube during a small part of the period generates a sine wave in the output resonant circuit. It is not necessary that the primary coils 33 of the transmitting transformer units 24 be part of a resonant circuit.

Since the transmisison lines 29, 30, 31 must be evacuated throughout their lengths, vacuum pumps 45 will be required at intervals along the transmission lines 29, 30, 31. Preferably such vacuum pumps 45 are of the type in which the gettering action of evaporated titanium is used in conjunction with an ionizing discharge.

The total length of each transmission line is limited by misalignments causing errors in the uniformity of the magnetic field, and by the scattering effect of residual gas. These events may cause the charged particles to be deflected away from the predetermined orbit. After such deflection away from the orbit, the focusing action of the magnetic cable causes the so-deflected particle to follow a path which oscillates, with respect to the orbit, with the wavelength λ which appears in Equations 18 and 19. Since there is a net focusing action associated with these oscillations, as hereinbefore described, there will be superimposed upon these oscillations an additional oscillatory movement which will be referred to herein as "free" oscillations and which have a wavelength given by Equation 32 of said U.S. Patent No. 2,736,799, as follows:

$$\lambda_f = \lambda \cdot \frac{\sqrt{2}}{\mu} \tag{31}$$

The amplitude of these "free" oscillations increase continuously with increasing length along the cable by an amount which depends on the technical quality of the manufacture of the magnetic cable. Since the "free" oscillations are initiated by random events, their amplitude increases as the square root of the length of the cable.

On the other hand, these oscillations of the charged particles result in their moving in paths which are curved, so that the charged particles undergo classical (Schwinger) radiation loss which tends to damp these oscillations. If the quality of construction of the transmission line is such that the radiation damping compensates the "free" oscillations, there is no limit to the length of the line.

As the energy of the charged particles along the orbit increases, radiation damping increases and the gain per unit length of orbit in the transverse energy of the charged particles, which gain is due to scattering and misalignments, decreases. It is therefore desirable to transmit charged particles through each transmission line at relatively high energy. As hereinbefore stated, one might inject electrons into each transmission line at 100 mev.; and at maximum power consumption, the electrons might return to the power-transmitting unit with at least 50 mev. It will be recalled that most of the energy of the returning electrons is not lost, but is returned to the power generator. By increasing radiation damping and decreasing scattering effects, operation at relatively high energy thus increases the maximum permissible length of the line.

Having thus described the principles of the invention, together with several illustrative embodiments thereof, it is to be understood that although specific terms are employed, they are used in a generic and descriptive sense and not for purposes of limitation, the scope of the invention being set forth in the following claims.

I claim:

1. Apparatus for the guidance of fast charged particles along a predetermined orbit, comprising an evacuated tubular member which is permanently magnetized in such a manner that the azimuthal component, with respect to the longitudinal axis of said evacuated tubular member, of the magnetic flux density therein increases in magnitude with increasing distance from said axis and is an alternating and periodic function of position along said axis and azimuthal position with respect to said axis.

2. Apparatus for the guidance of fast charged particles along a predetermined orbit, comprising an evacuated tubular member which is permanently magnetized in such a manner that the azimuthal component, with respect to the longitudinal axis of said evacuated tubular member, of the magnetic flux density therein increases in magnitude with increasing distance from said axis and is an alternating and periodic function of position along said axis and azimuthal position with respect to said axis, the periodicity along said axis of said azimuthal component of the magnetic flux density being characterized by a wavelength which is not more than $$2\pi r_0(0.44\beta V/150H_c r_0)^{1/2}$$

where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, and $H_c$ is the coercive force of the magnetic material of said evacuated tubular member in oersteds.

3. Apparatus for the guidance of fast charged particles along a predetermined orbit, comprising an evacuated tubular member which is permanently magnetized in such a manner that the azimuthal component, with respect to the longitudinal axis of said evacuated tubular member, of the magnetic flux density therein increases in magnitude with increasing distance from said axis and is an alternating and periodic function of position along said axis and azimuthal position with respect to said axis, the periodicity along said axis of said azimuthal component of the magnetic flux density being characterized by a wavelength which is not more than $$2\pi r_0(0.44\beta V/150H_c r_0)^{1/2}$$

said axis being a line whose radius of curvature throughout the length of said evacuated tubular member is greater than $r_0(\beta V/12H_c\lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said axis of said azimuthal component of the magnetic flux density.

4. Apparatus for the acceleration of charged particles along a predetermined orbit, comprising an evacuated tubular member including a plurality of mutually insulated sections, said sections being permanently magnetized in such a manner that the azimuthal component, with respect to the longitudinal axis of said evacuated tubular member, of the magnetic flux density therein increases in magnitude with increasing distance from said axis and is an alternating and periodic function of position along said axis and azimuthal position with respect to said axis; means for injecting charged particles into said evacuated tubular member along said axis; and means for producing an electric field along the gap between adjacent sections which is adapted to accelerate charged particles along said axis, said evacuated tubular member being coiled in such a way that a single electric-field producing means can be used to create the necessary electric field between more than one pair of adjacent sections, the periodicity along said axis of said azimuthal component of the magnetic flux density being characterized by a wavelength which is not more than $$2\pi r_0(0.44\beta V/150H_c r_0)^{1/2}$$

said axis being a line whose radius of curvature throughout the length of said evacuated tubular member is greater than $r_0(\beta V/12H_c\lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said axis of said azimuthal component of the magnetic flux density.

5. Apparatus for the acceleration of charged particles along a substantially circular but open orbit, comprising an evacuated toroidal sheath of conductive material which is severed to provide at least one gap; means for producing an electric field across said gap which is adapted to accelerate charged particles; an evacuated tubular member which is permanently magnetized in such a manner that the azimuthal component, with respect to the longitudinal axis of said evacuated tubular member, of the magnetic flux density therein increases in magnitude with increasing distance from said axis and is an alternating and periodic function of position along said axis and azimuthal position with respect to said axis, said tubular member being coiled in substantially helical form within said evacuated toroidal sheath and being severed at said gap, the periodicity along said axis of said azimuthal component of the magnetic flux density being characterized by a wavelength which is not more than $2\pi r_0(0.44\beta V/150H_c r_0)^{1/2}$, said axis being a line whose radius of curvature throughout the length of said evacuated tubular member is greater than $r_0(\beta V/12H_c\lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said axis of said azimuthal component of the magnetic flux density, and means for injecting charged particles into said evacuated tubular member along said axis.

6. Apparatus for the acceleration of charged particles along a substantially circular but open orbit, comprising an evacuated toroidal sheath of conductive material which is severed to provide at least one gap; means for producing an alternating magnetic flux which links said toroidal sheath, whereby an alternating electric field is produced across said gap which is adapted to accelerate charged particles; an evacuated tubular member which is permanently magnetized in such a manner that the azimuthal component, with respect to the longitudinal axis of said evacuated tubular member, of the magnetic flux density therein increases in magnitude with increasing distance from said axis and is an alternating and periodic function of position along said axis and azimuthal position with respect to said axis, said tubular member being coiled in substantially helical form within said evacuated toroidal sheath and being severed at said gap, the periodicity along said axis of said azimuthal component of the magnetic flux density being characterized by a wavelength which is not more than $2\pi r_0(0.44\beta V/150H_c r_0)^{1/2}$, said axis being a line whose radius of curvature throughout the length of said evacuated tubular member is greater than $r_0(\beta V/12 H_c \lambda)^2$, where V is the sum of the kinetic energy per unit charge and the rest energy per unit charge of the charged particles in volts, $\beta$ is the ratio of the velocity of said charged particles to the velocity of light in vacuo; $r_0$ is the inner radius of said evacuated tubular member in centimeters, $H_c$ is the coercive force of the magnetic material of said evacuated tubular member in oersteds, and $\lambda$ is the wavelength associated with the periodicity along said axis of said azimuthal component of the magnetic flux density, and means for injecting charged particles into said evacuated tubular member along said axis.

7. Apparatus for the acceleration of charged particles along a substantially circular but open orbit, comprising an evacuated toroidal sheath of conductive material which is severed to provide at least one gap; at least one conductive member electrically bridging said gap, said conductive member being adapted to cooperate with said evacuated toroidal sheath to form a resonant cavity suitable for providing a high-frequency alternating electric field across said gap which is adapted to accelerate charged particles; means for exciting said resonant cavity; an evacuated tubular member which is permanently magnetized in such a manner that the azimuthal component, with respect the longitudinal axis of said evacuated tubular member, of the magnetic flux density therein increases in magnitude with increasing distance from said axis and is an alternating and periodic function of position along said axis and azimuthal position with respect to said axis, said tubular member being coiled in substantially helical form within said evacuated toroidal sheath and being severed at said gap, the periodicity along said axis of said azimuthal component of the magnetic flux density being characterized by a wavelength which is not more than $2\pi r_0(0.44\beta V/150H_c r_0)^{1/2}$, said axis being a line whose radius of curvature throughout the length of said evacuated tubular member is greater than $r_0(\beta V/12 H_c \lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said axis of said azimuthal component of the magnetic flux density, and means for injecting charged particles into said evacuated tubular member along said axis.

8. Apparatus for the transmission of power comprising in combination a power-transmitting transformer unit adapted to convert the output of an alternating-current power source into a pulsed beam of fast charged particles; at least one power-consuming transformer unit adapted to derive alternating-current power from said pulsed beam of fast charged particles, a transmission line adapted to guide said pulsed beam of fast charged particles from said power-transmitting transformer unit to said power-consuming transformer unit and back to said power-transmitting transformer unit, and means for returning at least a part of the kinetic energy of said pulsed beam of fast charged particles to said alternating-current power source.

9. Apparatus for the transmission of power comprising in combination a plurality of power-transmitting transformer units each of which is adapted to convert the output of an alternating-current power source into a pulsed beam of fast charged particles; power-consuming transformer units adapted to derive alternating-current power from said pulsed beams of fast charged particles, a plurality of transmission lines each of which is adapted to guide one of said pulsed beams of fast charged particles from one of said power-transmitting transformer units to at least one of said power-consuming transformer units and back to one of said power-transmitting transformer units, and means for returning at least a part of the kinetic energy of each of said pulsed beams of fast charged particles to one of said alternating-current power sources.

10. A power-transmitting transformer unit for the conversion of alternating-current power into a pulsed beam of fast charged particles suitable for transmission to at least one remote power-consumption unit and return therefrom via a transmission line adapted to guide said pulsed beam of fast charged particles, comprising in combination: an evacuated toroidal sheath of conductive material which is severed to provide at least one gap; means for producing an alternating magnetic flux which links said toroidal sheath, whereby an alternating electric field is produced across said gap which is adapted to accelerate charged particles along a first substantially circular but open orbit; a first evacuated tubular member which encloses said first orbit; means for injecting charged particles into said first evacuated tubular member along said first orbit; means for ejecting charged particles from said first evacuated tubular member after acceleration thereof and directing said charged particles into one end of said transmission line; a second evacuated tubular member which encloses a second substantially circular but open orbit; means for directing the charged particles returning as a pulsed beam from the other end of said transmission line into said second evacuated tubular member along said second orbit; the length of said transmission line being such that said alternating electric field decelerates said returning charged particles; each of said evacuated tubular members being permanently magnetized in such a manner that the azimuthal component, with respect to each orbit respectively, of the magnetic flux density therein increases in magnitude with increasing distance from said orbit and is an alternating and periodic function of position along said orbit and azimuthal position with respect to said orbit, each of said evacuated tubular members being coiled in substantially helical form within said evacuated toroidal sheath and being severed at said gap, the periodicity along said orbit of said azimuthal component of the magnetic flux density being characterized by a wavelength which is not more than $2\pi r_0(0.44\beta V/150H_c r_0)^{1/2}$, said orbit being a line whose radius of curvature throughout the length of said evacuated tubular member is greater than $r_0(\beta V/12 H_c \lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said orbit of said azimuthal component of the magnetic flux density.

11. In combination, a plurality of power-transmitting transformer units for the conversion of alternating-current power into a corresponding plurality of pulsed beams of fast charged particles each of which is suitable for transmission to at least one remote power-consumption unit and return therefrom via a transmission line adapted to guide said pulsed beam of fast charged particles, each of said power-transmitting transformer units comprising in combination: an evacuated toroidal sheath of conductive material which is severed to provide at least one gap; means for producing an alternating magnetic flux which links said toroidal sheath, whereby an alternating electric field is produced across said gap which is adapted to accelerate charged particles along a first substantially circular but open orbit; a first evacuated tubular member which encloses said first orbit; means for injecting charged particles into said first evacuated tubular member along said first orbit; means for ejecting charged particles from said first evacuated tubular member after acceleration thereof and directing said charged particles into one end of one of said transmission lines; a second evacuated tubular member which encloses a second substantially circular but open orbit; means for directing the charged particles returning as a pulsed beam from another end of one of said transmission lines into said second evacuated tubular member along said second orbit; the length of said transmission lines being such that said alternating electric field decelerates said returning charged particles; each of said evacuated tubular members being permanently magnetized in such a manner that the azimuthal component, with respect to each orbit respectively, of the magnetic flux density therein increases in magnitude with increasing distance from said orbit and is an alternating and periodic function of position along said orbit and azimuthal position with respect to said orbit, each of said evacuated tubular members being coiled in substantially helical form within said evacuated toroidal sheath and being severed at said gap, the periodicity along said orbit of said azimuthal component of the magnetic flux density being characterized by a wavelength which is not more than $2\pi r_0(0.44\beta V/150H_c r_0)^{1/2}$, said orbit being a line whose radius of curvature throughout the length of said evacuated tubular member is greater than $r_0(\beta V/12H_c \lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said orbit of said azimuthal component of the magnetic flux density.

12. A transformer unit for the derivation of alternating-current power from a pulsed beam of fast charged particles comprising in combination an evacuated toroidal sheath of conductive material which is severed to provide at least one gap; an evacuated tubular member which encloses a substantially circular but open orbit and which is coiled in substantially helical form within said evacuated toroidal sheath and is severed at said gap; said evacuated tubular member being permanently magnetized in such a manner that the azimuthal component, with respect to said orbit, of the magnetic flux density therein increases in magnitude with increasing distance from said orbit and is an alternating and periodic function of position along said orbit and azimuthal position with respect to said orbit, the periodicity along said orbit of said azimuthal component of the magnetic flux density being characterized by a wavelength which is not more than $2\pi r_0(0.44\beta V/150H_c r_0)^{1/2}$, said orbit being a line whose radius of curvature throughout the length of said evacuated tubular member is greater than $r_0(\beta V/12H_c \lambda)^2$, where V is the sum of the kinetic energy per unit charge and the rest energy per unit charge of the charged particles in volts, $\beta$ is the ratio of the velocity of said charged particles to the velocity of light in vacuo, $r_0$ is the inner radius of said evacuated tubular member in centimeters, $H_c$ is the coercive force of the magnetic material of said evacuated tubular member in oersteds, and $\lambda$ is the wavelength associated with the periodicity along said orbit of said azimuthal component of the magnetic flux density; means for directing said pulsed beam of fast charged particles into said evacuated tubular member along said orbit, whereby the motion of said pulsed beam across said gap induces an alternating magnetic flux which links said toroidal sheath; and a power-consuming circuit including a coil linking said alternating magnetic flux so as to derive power therefrom.

13. Apparatus in accordance with claim 12, wherein said power-consuming circuit includes a capacitance which resonates with said coil to provide a sinusoidal output, despite the pulsed nature of said pulsed beam.

References Cited in the file of this patent

UNITED STATES PATENTS

| Number | Name | Date |
|---|---|---|
| 1,645,304 | Slepian | Oct. 11, 1927 |
| 2,299,792 | Bouwers et al. | Oct. 27, 1942 |
| 2,473,477 | Smith | June 14, 1949 |
| 2,599,188 | Livingston | June 3, 1952 |
| 2,639,401 | Skellett | May 19, 1953 |
| 2,683,216 | Wideroe | July 6, 1954 |
| 2,736,799 | Christofilos | Feb. 28, 1956 |
| 2,808,532 | Field | Oct. 1, 1957 |
| 2,844,753 | Quatl | July 22, 1958 |